(12) United States Patent
Lee et al.

(10) Patent No.: US 8,375,985 B2
(45) Date of Patent: *Feb. 19, 2013

(54) SOLENOID VALVE FOR BRAKE SYSTEM

(75) Inventors: Chung Jae Lee, Gyeonggi-do (KR); Dong Il Seo, Gyeonggi-do (KR); Sang Cheol Lee, Gyeonggi-do (KR)

(73) Assignee: Mando Corporation, Pyeongtaek-Si (KR)

( * ) Notice: Subject to any disclaimer, the term of this patent is extended or adjusted under 35 U.S.C. 154(b) by 952 days.

This patent is subject to a terminal disclaimer.

(21) Appl. No.: 12/051,978

(22) Filed: Mar. 20, 2008

(65) Prior Publication Data

US 2009/0096282 A1 Apr. 16, 2009

(30) Foreign Application Priority Data

Oct. 11, 2007 (KR) .......................... 10-2007-102359
Oct. 11, 2007 (KR) .......................... 10-2007-102360

(51) Int. Cl.
*F16K 31/06* (2006.01)
(52) U.S. Cl. .................................. 137/550; 251/129.15
(58) Field of Classification Search .................. 137/550; 303/119.2; 251/129.15
See application file for complete search history.

(56) References Cited

U.S. PATENT DOCUMENTS

| | | | | |
|---|---|---|---|---|
| 6,019,128 A * | 2/2000 | Reiter | ........................... | 137/549 |
| 6,189,985 B1 * | 2/2001 | Fritsch et al. | ............. | 303/119.2 |
| 6,254,199 B1 * | 7/2001 | Megerle et al. | ............ | 303/119.2 |
| 6,382,250 B1 * | 5/2002 | Gruschwitz et al. | ..... | 137/601.14 |
| 6,405,752 B1 * | 6/2002 | Fritsch et al. | ................. | 137/550 |
| 7,866,625 B2 * | 1/2011 | Lee et al. | ................... | 251/30.04 |
| 2005/0073194 A1 * | 4/2005 | Katayama | ................. | 303/119.2 |

FOREIGN PATENT DOCUMENTS

| | | |
|---|---|---|
| DE | 196 35 690 B4 | 3/1998 |
| DE | 198 48 919 A | 4/2000 |
| DE | 103 23 656 C1 | 5/2000 |
| DE | 199 51 665 A | 5/2001 |
| DE | 100 38 091 B4 | 2/2002 |
| EP | 0 794 886 B1 | 9/1999 |
| KR | 1020030028004 | 8/2003 |

OTHER PUBLICATIONS

Chinese Office Action Issued in Chinese Patent Application No. CN 200810087438.2, dated May 20, 2011.

* cited by examiner

*Primary Examiner* — Stephen M Hepperle
*Assistant Examiner* — Ian Paquette
(74) *Attorney, Agent, or Firm* — McDermott Will & Emery LLP

(57) ABSTRACT

A solenoid valve for a brake system capable of being easily manufactured with reduced manufacturing costs is disclosed. A valve seat member has an inner passage formed through the valve seat member in a longitudinal direction thereof, an outer passage formed on an outer surface of the valve seat member in the longitudinal direction, and a seat portion formed with a first orifice above the inner passage. The seat portion is formed unitarily with the valve seat member. A sleeve is coupled on the outer surface of the valve seat member. The sleeve has a flange portion to be fixed to a modulator block. A valve core is coupled to a portion of the sleeve, opposite to the flange portion. An armature is slidably mounted in the sleeve. The armature has an opening/closing portion to open or close the first orifice. A restoring spring presses the armature toward the first orifice.

9 Claims, 5 Drawing Sheets

SOLENOID VALVE FOR BRAKE SYSTEM

CROSS-REFERENCE TO RELATED APPLICATION

This application claims the benefit of Korean Patent Application Nos. 2007-0102359 and 2007-0102360, filed on Oct. 11, 2007 in the Korean Intellectual Property Office, the disclosure of which is incorporated herein by reference.

BACKGROUND OF THE INVENTION

1. Field of the Invention

The present invention relates to a solenoid valve for a brake system, and more particularly, to a solenoid valve for a brake system capable of being more easily manufactured and reducing manufacturing costs.

2. Description of the Related Art

Generally, an anti-lock brake system for vehicles serves to prevent locking of wheels by sensing slippage of the wheels and suitably controlling braking pressure applied to the wheels. The wheels of the vehicle do not slip during braking by means of the anti-lock brake system, whereby the steering performance of the vehicle is maintained, and the vehicle is stopped safely.

In order to control braking pressure, the brake system includes a plurality of solenoid valves to open or close a fluid path of a braking hydraulic pressure line. The solenoid valves include normal open type solenoid valves which are normally kept in an opened state, and normal close type solenoid valves which are normally kept in a closed state.

FIG. 1 shows a conventional normal close type solenoid valve. A conventional normal close type solenoid valve is press-fitted in a bore 14 of a modulator block 13, in which fluid paths of a brake system are formed. The valve includes a hollow valve housing 1 having an inlet 3 and an outlet 4, through which fluid flows.

A cylindrical-shaped sleeve 6 is coupled to an end portion of the valve housing 1, and an armature 5 is slidably mounted in the sleeve 6. A valve core 7 is coupled to an opened end portion of the sleeve 6 to shield the opened end portion of the sleeve 6 and to slide the armature 5. The armature 5 opens or closes an orifice 8a of a valve seat 8 by its sliding motion. To achieve this, the armature 5 is provided with an opening/closing portion 5a which is extended toward the valve seat 8 through a hollow portion 2 of the valve housing 1.

A restoring spring 9 is mounted between the armature 5 and the valve core 7, so as to press the armature 5 to close the orifice 8a in a normal state. An exciting coil assembly 10 is mounted around the sleeve 6 and the valve core 7, so as to slide the armature 5. An orifice member 11 is mounted in the valve housing 1, and an O-ring 12 is mounted on an outer peripheral surface of the valve housing 1 to form a seal between the valve housing 1 and an inner surface of the bore 14.

When electric power is applied to the exciting coil assembly 10, the armature 5 is moved toward the valve core 7 by a magnetic force, and opens the orifice 8a of the valve seat 8. When electric power is not applied to the exciting coil assembly 10, a magnetic force is not generated, and the armature 5 is moved to close the orifice 8a by an elastic force of the restoring spring 9.

As described above, the conventional solenoid valve is constituted such that the valve housing and the valve seat are separately provided, the valve seat is press-fitted in the valve housing, and the opening/closing portion of the armature is extended toward the valve seat through the hollow portion of the valve housing. However, the conventional solenoid valve as constituted above has problems such that the opening/closing portion of the armature should be formed long, the number of components is large, the structure is complicated, and the valve's manufacturing is difficult. Accordingly, manufacturing costs are high.

Further, because the sleeve and the valve core are coupled to each other through a welding process, and also the sleeve and the valve housing are coupled to each other through a welding process, the above-described conventional solenoid valve has shortcomings of high work effort and low assembling productivity.

SUMMARY OF THE INVENTION

Therefore, it is an aspect of the invention to provide a solenoid valve for a brake system, which has a simple constitution and can be easily manufactured with reduced manufacturing costs.

Additional aspects and/or advantages of the invention will be set forth in part in the description which follows and, in part, will be obvious from the description, or may be learned by practice of the invention.

In accordance with an aspect of the invention, there is provided a solenoid valve for a brake system, comprising: a valve seat member having an inner passage formed through the valve seat member in a longitudinal direction thereof, an outer passage formed on an outer surface of the valve seat member in the longitudinal direction, and a seat portion formed with a first orifice above the inner passage, the seat portion being formed unitarily with the valve seat member; a sleeve coupled on the outer surface of the valve seat member, the sleeve having a flange portion to be fixed to a modulator block; a valve core coupled to a portion of the sleeve, opposite to the flange portion; an armature slidably mounted in the sleeve, the armature having an opening/closing portion to open or close the first orifice; and a restoring spring to press the armature toward the first orifice.

The seat portion may be provided at an end portion of the valve seat member adjacent to the opening/closing portion, and may be positioned in the sleeve.

The solenoid valve may further comprise a filter member mounted on the outer surface of the valve seat member.

The outer passage may be formed in a groove shape on the outer surface of the valve seat member.

The valve seat member may be provided with a stepped portion protruded from the outer surface thereof, on which the flange portion of the sleeve is supported.

The valve core may have a coupling recess formed on an outer surface thereof, and the sleeve may have a latching portion formed by deformation of the sleeve. The valve core may be coupled to the sleeve by the latching portion being fitted into the coupling recess and latched by the coupling recess by deformation of the sleeve.

The solenoid valve may further comprise an orifice member formed with a second orifice. The orifice member may be mounted in the inner passage.

In accordance with another aspect of the invention, there is provided a solenoid valve for a brake system, comprising: a valve seat member having an inner passage formed through the valve seat member in a longitudinal direction thereof, an outer passage formed on an outer surface of the valve seat member in the longitudinal direction, and a seat portion formed with a first orifice above the inner passage, the seat portion being formed unitarily with the valve seat member; a sleeve having a first end portion coupled on the outer surface of the valve seat member, a second end portion opposite to the first end portion, and a flange portion formed at the first end portion to be fixed to a modulator block; a valve core coupled to the second end portion of the sleeve; an armature slidably mounted in the sleeve, the armature having an opening/closing portion to open or close the first orifice; a restoring spring to press the armature toward the first orifice; and a filter member coupled on the outer surface of the valve seat member to filter out foreign substances, the filter member having a connecting passage connected to the inner passage of the valve seat member, and a second orifice formed in the connecting passage.

BRIEF DESCRIPTION OF THE DRAWINGS

These and/or other aspects and advantages of the exemplary embodiments of the invention will become apparent and more readily appreciated from the following description of the embodiments, taken in conjunction with the accompanying drawings, of which.

DETAILED DESCRIPTION OF THE PREFERRED EMBODIMENTS

Figure 1:
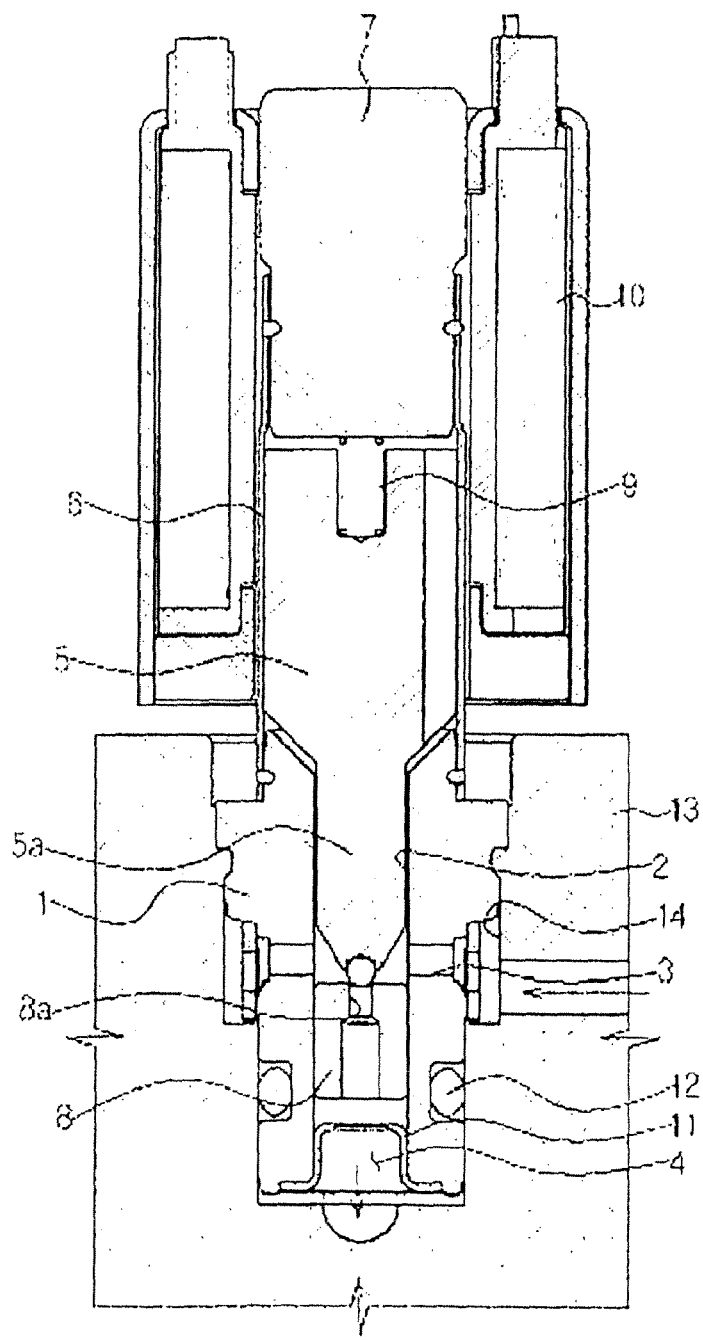
FIG. 1 is a sectional view of a conventional solenoid valve for a brake system.

Reference will now be made in detail to exemplary embodiments of the present invention, examples of which are illustrated in the accompanying drawings, wherein like reference numerals refer to like elements throughout. The embodiments are described below to explain the present invention by referring to the figures.

Figure 2:
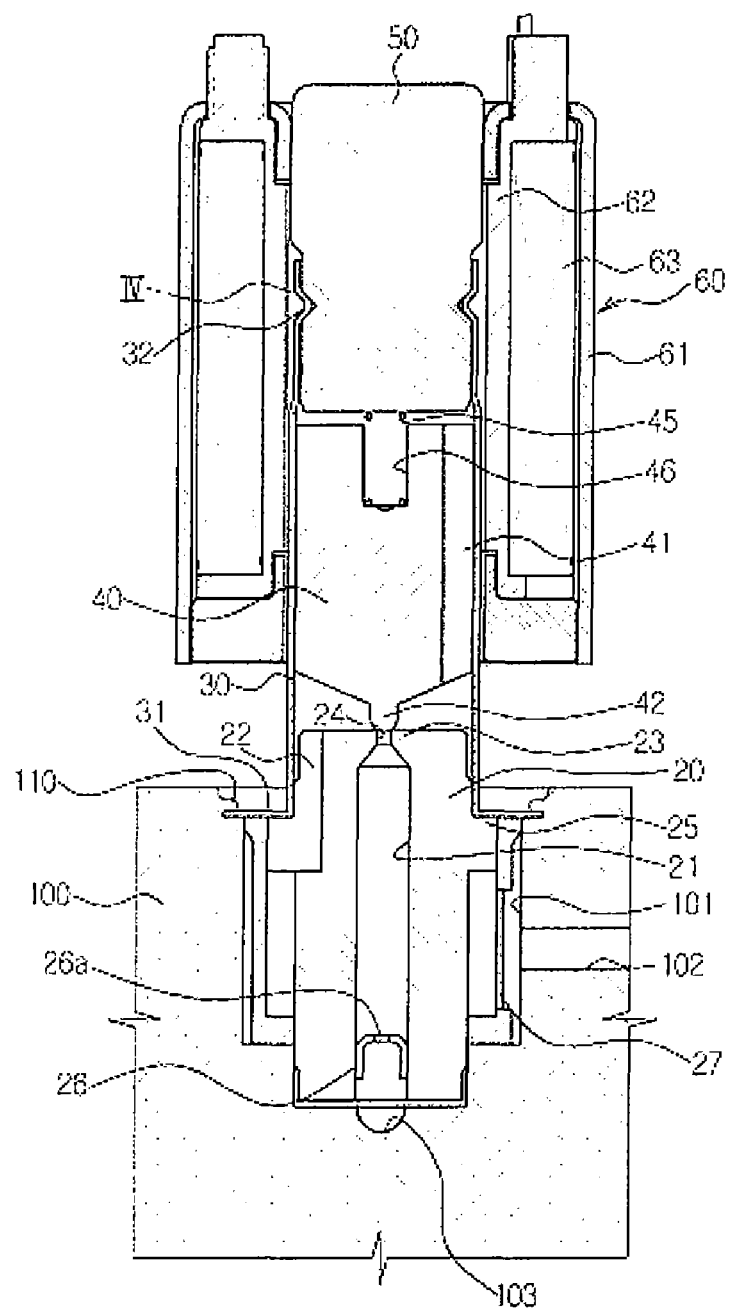
FIG. 2 is a sectional view of a solenoid valve for a brake system according to a first embodiment of the present invention, which shows a closed state of a first orifice.
Figure 3:
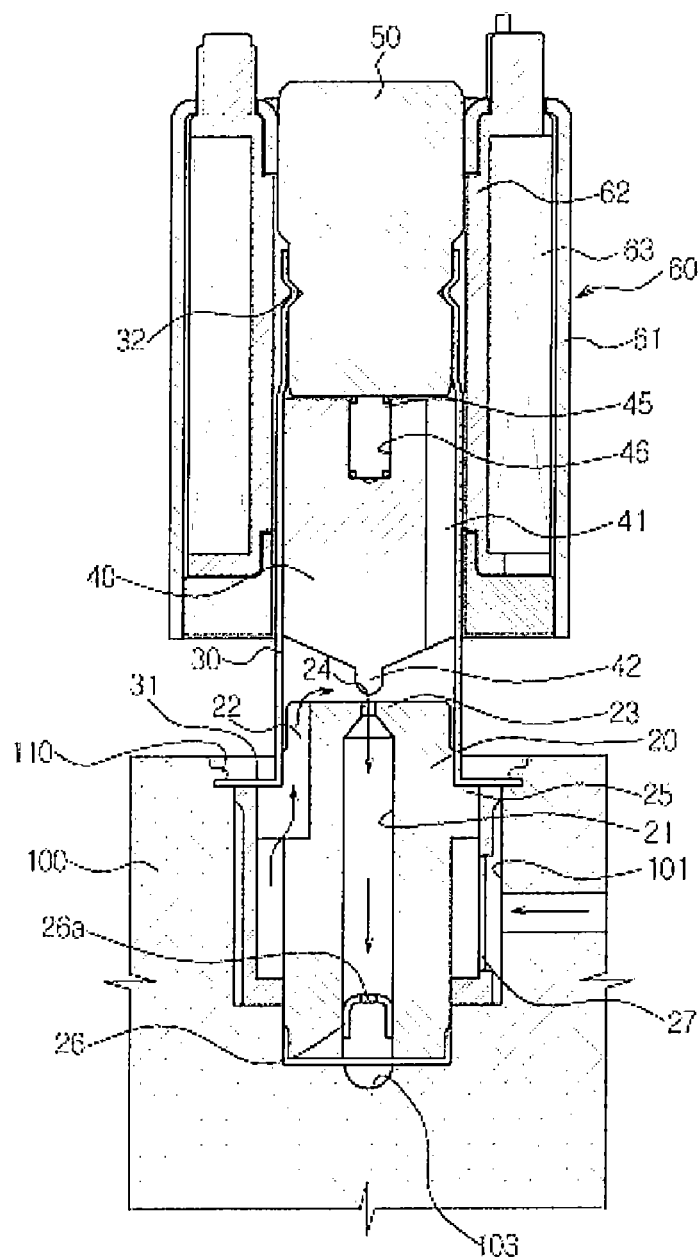
FIG. 3 is a sectional view of the solenoid valve for a brake system according to the first embodiment of the present invention, which shows an opened state of the first orifice.
Figure 4:
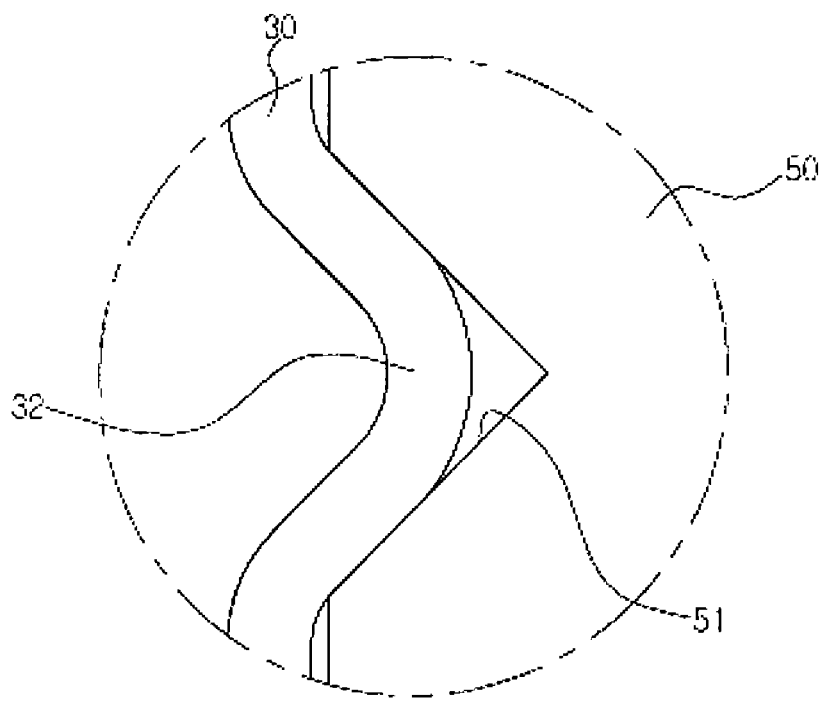
FIG. 4 is a detailed view of a IV portion in FIG. 2.

FIGS. 2 to 4 show a solenoid valve for a brake system according to a first embodiment of the present invention. A solenoid valve according to the first embodiment, as shown in FIG. 2, comprises a valve seat member 20, a sleeve 30, an armature 40, a valve core 50 and an exciting coil assembly 60.

The valve seat member 20 has an inner passage 21 which is formed through the valve seat member 20 in a longitudinal direction (up/down direction) thereof, and an outer passage 22 which is formed on an outer surface of the valve seat member 20 in the longitudinal direction. A seat portion 23 formed with a first orifice 24 is provided above the inner passage 21 of the valve seat member 20. The seat portion 23 is formed unitarily with the valve seat member 20. The valve seat member 20 is provided with a stepped portion 25 which is protruded from the outer surface of the valve seat member 20 to be coupled with the sleeve 30. The outer passage 22 is formed in a groove shape, which is extended long from the stepped portion 25 to a top of the valve seat member 20.

An orifice member 26 formed with a second orifice 26a is mounted in the inner passage 21 of the valve seat member 20, so as to stabilize flow of fluid. A filter member 27 is mounted at an exterior of the valve seat member 20, so as to filter out foreign substances from oil introduced through an inlet passage 102 of a modulator block 100. The filter member 27 is formed in a cylindrical shape, which is coupled on the outer lower surface of the valve seat member 20. While being coupled on the outer surface of the valve seat member 20, the filter member 27 is mounted into a bore 101 of the modulator block 100.

The sleeve 30 is formed in a cylindrical shape, and has an inner diameter corresponding to an outer diameter of an upper portion of the valve seat member 20. A lower end portion (first end portion) of the sleeve 30 is press-fitted on the outer surface of the valve seat member 20. The first end portion of the sleeve 30 is provided with a flange portion 31. The flange portion 31 is fixed by deformation of the modulator block 100 when the solenoid valve is mounted to the modulator block 100. The stepped portion 25 of the valve seat member 20 serves to determine a coupling position of the flange portion 31 when the flange portion 31 is coupled to the valve seat member 20, as well as to support the flange portion 31, to thereby securely couple the flange portion 31 to the valve seat member 20. As such, when the sleeve 30 and the valve seat member 20 are coupled, the seat portion 23 of the valve seat member 20 is received in the sleeve 30. The outer passage 22 of the valve seat member 20 is formed in a groove shape on a portion coupled with the sleeve 30. Accordingly, oil passing through the filter member 27 can flow into the sleeve 30 through the outer passage 22.

The valve core 50 is press-fitted in an upper end portion (second end portion) of the sleeve 30, and shields the opened top of the sleeve 30. In order to couple the valve core 50 to the sleeve 30, as shown in FIG. 4, the valve core 50 is formed with a coupling recess 51 along the outer peripheral surface of the valve core 50, and the sleeve 30 is provided with a latching portion 32 which is formed by deformation of the sleeve 30 so as to be fitted into the coupling recess 51 and latched by the coupling recess 51. In other words, the valve core 50 can be fixed to the sleeve 30 in such a manner that the valve core 50 is first inserted into the sleeve 30 and then the latching portion 32 is formed by deformation of the sleeve 30. When compared to a conventional welding process, the above coupling structure can facilitate the coupling of the sleeve 30 and the valve core 50, and can simplify the coupling process.

The armature 40 is up/down slidably mounted in the sleeve 30. The armature 40 is formed in a cylindrical shape, and has an outer diameter corresponding to the inner diameter of the sleeve 30. The armature 40 is formed with an oil passage 41 on an outer surface thereof in the up/down direction. In addition, the armature 40 is provided with a semispherical-shaped opening/closing portion 42 at a lower end thereof, so as to close the first orifice 24 of the seat portion 23. Accordingly, the armature 40 can open or close the first orifice 24 by its sliding motion in the sleeve 30.

A restoring spring 45 is mounted between the armature 40 and the valve core 50, to press the armature 40 toward the seat portion 23 in a normal state. The restoring spring 45 is received in a spring receiving recess 46 formed on the top of the armature 40. This is for the purpose of making the opening/closing portion 42 of the armature 40 close the first orifice 24 in a normal state by the restoring spring 45 pressing the armature 40 toward the seat portion 23.

The exciting coil assembly 60 is provided in a cylindrical shape, and is coupled to the outer upper surfaces of the valve core 50 and the sleeve 30. The exciting coil assembly 60 includes a cylindrical-shaped coil case 61, a bobbin 62 accommodated in the coil case 61, and an exciting coil 63 wound on an outer surface of the bobbin 62. When electric power is applied to the exciting coil 63, a magnetic field is generated, so that the armature 40 is moved toward the valve core 50, thereby opening the first orifice 24.

When intending to mount the solenoid valve to the modulator block 100, first, the valve seat member 20, the sleeve 30, the armature 40, the restoring spring 45, the valve core 50 and the filter member 27 are all assembled. Thereafter, the filter member 27 and the valve seat member 20 are introduced into the bore 101 of the modulator block 100. In such a state, an inlet portion of the bore 101 of the modulator block 100 is deformed. By doing so, a deformed portion 110 of the modulator block 100 is formed to cover the flange portion 31 of the sleeve 30, so as to fix the sleeve 30. Through the above processes, the installation of the valve is achieved.

Since the seat portion 23 is formed unitarily with the valve seat member 20 and the sleeve 30 is coupled to the valve seat member 20, the solenoid valve of the first embodiment has advantages of reduction of the number of parts and simplification of the constitution. That is, the solenoid valve of the first embodiment has the constitution simpler than a prior art in which a valve housing and a valve seat are separately provided. Also, since the flange portion 31 of the sleeve 30 is directly fixed to the modulator block 100 while the sleeve 30 is coupled to the outer surface of the valve seat member 20, the solenoid valve of the first embodiment can be easily assembled. Further, because an additional welding process is not required to couple the valve seat member 20 and the sleeve 30, the manufacturing processes can be simplified. Still further, the valve core 50 and the sleeve 30 can be easily coupled to each other by means of the coupling recess 51 and the latching portion 32 formed by deformation of the sleeve 30. Accordingly, the solenoid valve of this embodiment has a simple constitution, and can be easily manufactured. As a result, manufacturing costs can be reduced.

In addition, since the seat portion 23 is provided at the top of the valve seat member 20 and is received in the sleeve 30, the solenoid valve of the first embodiment has an advantage of decrease in the length of the armature 40. As a result, the overall length of the valve can be decreased.

The opening/closing operation of the solenoid valve according to the present invention will now be explained.

As shown in FIG. 2, when electric power is not applied to the exciting coil assembly 60, because the restoring spring 45 pushes the armature 40 toward the first orifice 24, the opening/closing portion 42 of the armature 40 closes the first orifice 24. Accordingly, oil cannot flow from the inlet passage 102 to an outlet passage 103 of the modulator block 100.

As shown in FIG. 3, when electric power is applied to the exciting coil assembly 60, the armature 40 is moved toward the valve core 50 against the elastic force of the restoring spring 45 by the magnetic force exerted between the armature 40 and the valve core 50. Accordingly, the first orifice 24 is opened. If the first orifice 24 is opened, the oil in the inlet passage 102 passes through the filter member 27, and flows into the sleeve 30 through the outer passage 22. Subsequently, the oil flows to the outlet passage 103 via the first orifice 24.

Figure 5:
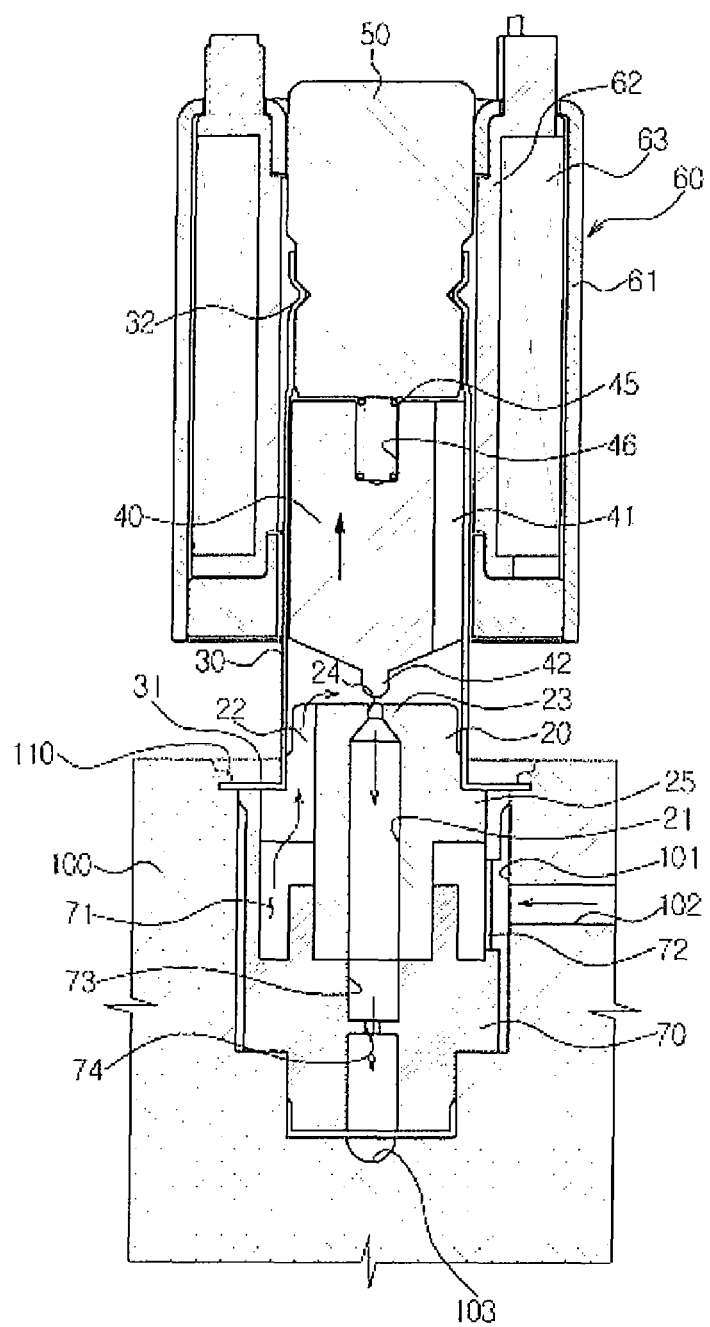
FIG. 5 is a sectional view of a solenoid valve for a brake system according to a second embodiment of the present invention.

FIG. 5 is a sectional view showing a solenoid valve for a brake system according to a second embodiment of the present invention. As shown in FIG. 5, a solenoid valve of the second embodiment has features such that a valve seat member 20 is formed shorter than the valve seat member of the solenoid valve of the first embodiment, and a filter member 70 surrounds a peripheral surface and a bottom of the valve seat member 20.

The filter member 70, as shown in FIG. 5, has a receiving space 71 to receive the peripheral surface and the bottom of the valve seat member 20. A filtering part 72 is mounted to a side wall of the filter member 70, which defines the receiving space 71, so as to filter out foreign substances from oil introduced through the inlet passage 102 of the modulator block 100. The filter member 70 is also formed with a connecting passage 73 which is connected to the inner passage 21 of the valve seat member 20. A second orifice 74 is formed in the connecting passage 73, to stabilize flow of fluid. While being coupled on the outer surface of the valve seat member 20, the filter member 70 is introduced into the bore 101 of the modulator block 100, together with the valve seat member 20. Since the remaining constitution of the solenoid valve of the second embodiment is substantially the same as that of the first embodiment, explanation thereof will be omitted.

As described above, because the second orifice 74 is formed at the filter member 70, the solenoid valve of the second embodiment has an advantage such that an additional orifice member for forming the second orifice 74 is not needed to be mounted. Further, the solenoid valve of this embodiment has a simple constitution, and can be easily assembled and manufactured. As a result, manufacturing costs can be reduced.

As apparent from the above description, the solenoid valve according to the present invention can reduce the number of parts and can simplify the constitution, because the seat portion is formed unitarily with the valve seat member, and the sleeve is coupled to the valve seat member.

Further, since the flange portion of the sleeve is directly fixed to the modulator block, the solenoid valve can be easily assembled. Because an additional welding process is not required to couple the valve seat member and the sleeve, the coupling process can be easily achieved. Because the valve core and the sleeve are coupled by means of the coupling recess and the latching portion formed by deformation of the sleeve, the coupling process can be easily achieved. Accordingly, the solenoid valve according to the present invention can be easily manufactured with reduced manufacturing costs.

Further, since the seat portion of the valve seat member is received in the sleeve, the length of the armature can be decreased. As a result, the overall length of the solenoid valve according to the present invention can also be decreased.

Still further, since the second orifice is formed at the filter member, an additional orifice member for forming the second orifice is not needed to be mounted. Accordingly, the solenoid valve according to the present invention can further simplify the constitution.

Although embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A solenoid valve for a brake system, comprising:
    a valve seat member having an inner passage provided through the valve seat member in a longitudinal direction thereof, an outer passage provided on an outer surface of the valve seat member in the longitudinal direction, and a seat portion having a first orifice above the inner passage, the seat portion being unitary with the valve seat member;
    an inlet deformable portion of a modulator block integral therewith;
    a sleeve including a flange portion coupled on the outer surface of the valve seat member, wherein the flange portion of the sleeve is fixed to the modulator block beneath the inlet deformable portion of the modulator block that interlocks with the flange portion;
    a valve core coupled to a portion of the sleeve, opposite to the flange portion, wherein the valve core includes a coupling recess disposed on an outer surface thereof, and the sleeve includes a latching portion formed by deformation of the sleeve, whereby the valve core is coupled to the sleeve by the latching portion being fitted into the coupling recess and latched by the coupling recess by the deformation of the sleeve;

an armature slidably mounted in the sleeve, the armature having an opening/closing portion to open or close the first orifice;

a restoring spring to press the armature toward the first orifice; and a filter member mounted in a longitudinal direction on the outer surface of the valve seat member, wherein the outer passage of the valve seat member is provided entirely along the outer surface of the valve seat member in a groove shape between the valve seat member and the sleeve.

2. The solenoid valve according to claim 1, wherein the seat portion is provided at an end portion of the valve seat member adjacent to the opening/closing portion, and is positioned in the sleeve.

3. The solenoid valve according to claim 1, wherein the outer passage is disposed in a groove shape on the outer surface of the valve seat member.

4. The solenoid valve according to claim 1, wherein the valve seat member is provided with a stepped portion protruding from the outer surface thereof, whereby the flange portion of the sleeve is supported on the stepped portion.

5. The solenoid valve according to claim 1, further comprising:

an orifice member having a second orifice, the orifice member being mounted in the inner passage.

6. A solenoid valve for a brake system, comprising:

a valve seat member having an inner passage provided through the valve seat member in a longitudinal direction thereof, an outer passage provided on an outer surface of the valve seat member in the longitudinal direction, and a seat portion having a first orifice above the inner passage, the seat portion being unitary with the valve seat member;

an inlet deformable portion of a modulator block integral therewith;

a sleeve having a first end portion coupled on the outer surface of the valve seat member, a second end portion opposite to the first end portion, and a flange portion disposed at the first end portion, wherein the flange portion of the sleeve is fixed to the modulator block beneath the inlet deformable portion of the modulator block that interlocks with the flange portion;

a valve core coupled to the second end portion of the sleeve, wherein the valve core includes a coupling recess disposed on an outer surface thereof, and the sleeve includes a latching portion formed by deformation of the sleeve, whereby the valve core is coupled to the sleeve by the latching portion being fitted into the coupling recess and latched by the coupling recess by the deformation of the sleeve;

an armature slidably mounted in the sleeve, the armature having an opening/closing portion to open or close the first orifice;

a restoring spring to press the armature toward the first orifice; and a filter member disposed on the outer surface of the valve seat member to filter out foreign substances, the filter member having a connecting passage connected to the inner passage of the valve seat member and a second orifice provided in the filter member within the connecting passage, wherein the outer passage of the valve seat member is provided entirely along the outer surface of the valve seat member in a groove shape between the valve seat member and the sleeve.

7. The solenoid valve according to claim 6, wherein the seat portion is provided at an end portion of the valve seat member, which is positioned in the sleeve, adjacent to the opening/closing portion.

8. The solenoid valve according to claim 6, wherein the outer passage is disposed in a groove shape on the outer surface of the valve seat member to form a fluid passage on a portion coupled with the sleeve.

9. The solenoid valve according to claim 6, wherein the valve seat member is provided with a stepped portion protruding from the outer surface thereof, whereby the flange portion of the sleeve is supported on the stepped portion.

* * * * *